US008029197B2

(12) United States Patent
McKay

(10) Patent No.: US 8,029,197 B2
(45) Date of Patent: Oct. 4, 2011

(54) HAND-HELD IMAGE STABILIZATION AND BALANCING SYSTEM FOR CAMERAS

(76) Inventor: Thomas McKay, Austin, TX (US)

(*) Notice: Subject to any disclaimer, the term of this patent is extended or adjusted under 35 U.S.C. 154(b) by 0 days.

(21) Appl. No.: 12/700,013

(22) Filed: Feb. 4, 2010

(65) Prior Publication Data

US 2011/0188847 A1 Aug. 4, 2011

(51) Int. Cl.
*G03B 17/00* (2006.01)
(52) U.S. Cl. .................... 396/421; 396/428
(58) Field of Classification Search ............ 396/421, 396/428
See application file for complete search history.

(56) References Cited

U.S. PATENT DOCUMENTS

| | | | | |
|---|---|---|---|---|
| 3,353,776 A | * | 11/1967 | Clemens | 248/183.2 |
| 4,249,817 A | * | 2/1981 | Blau | 396/428 |
| 5,230,490 A | | 7/1993 | Sloop | |
| 6,808,324 B2 | | 10/2004 | McKay | |
| 6,824,319 B1 | * | 11/2004 | Speggiorin | 396/428 |
| 6,905,264 B2 | | 6/2005 | McKay | |
| 2006/0231700 A1 | | 10/2006 | Orf et al. | |
| 2010/0172643 A1 | * | 7/2010 | Sudhana et al. | 396/428 |
| 2010/0208131 A1 | * | 8/2010 | Zarpellon | 348/373 |
| 2010/0259671 A1 | * | 10/2010 | Lindsay et al. | 348/373 |
| 2010/0266271 A1 | * | 10/2010 | Carlesso et al. | 396/428 |

* cited by examiner

*Primary Examiner* — Rodney Fuller
(74) *Attorney, Agent, or Firm* — Jacobson Holman PLLC

(57) ABSTRACT

A hand-held image stabilization and balancing system for cameras includes a main body part having a C-shaped member, a handle gimbaled to the main body part and releasably lockable in a fixed position, a camera mounting platform pivotably mounted to the main body part by a tilting joint, a pivoting plate pivotably mounted to the main body part, and a tripod mounted to the pivoting plate by a panning joint for rotation relative to the main body part. The tilting joint is located at the free end of the upper arm, and the pivoting plate is mounted at the free end of the lower arm for pivoting about an axis perpendicular to the plane of the C-shaped member. The stabilization device has a travel mode, in which it is folded for compactness, and a number of use modes, in which it can be used to stabilize a camera mounted thereon.

12 Claims, 16 Drawing Sheets

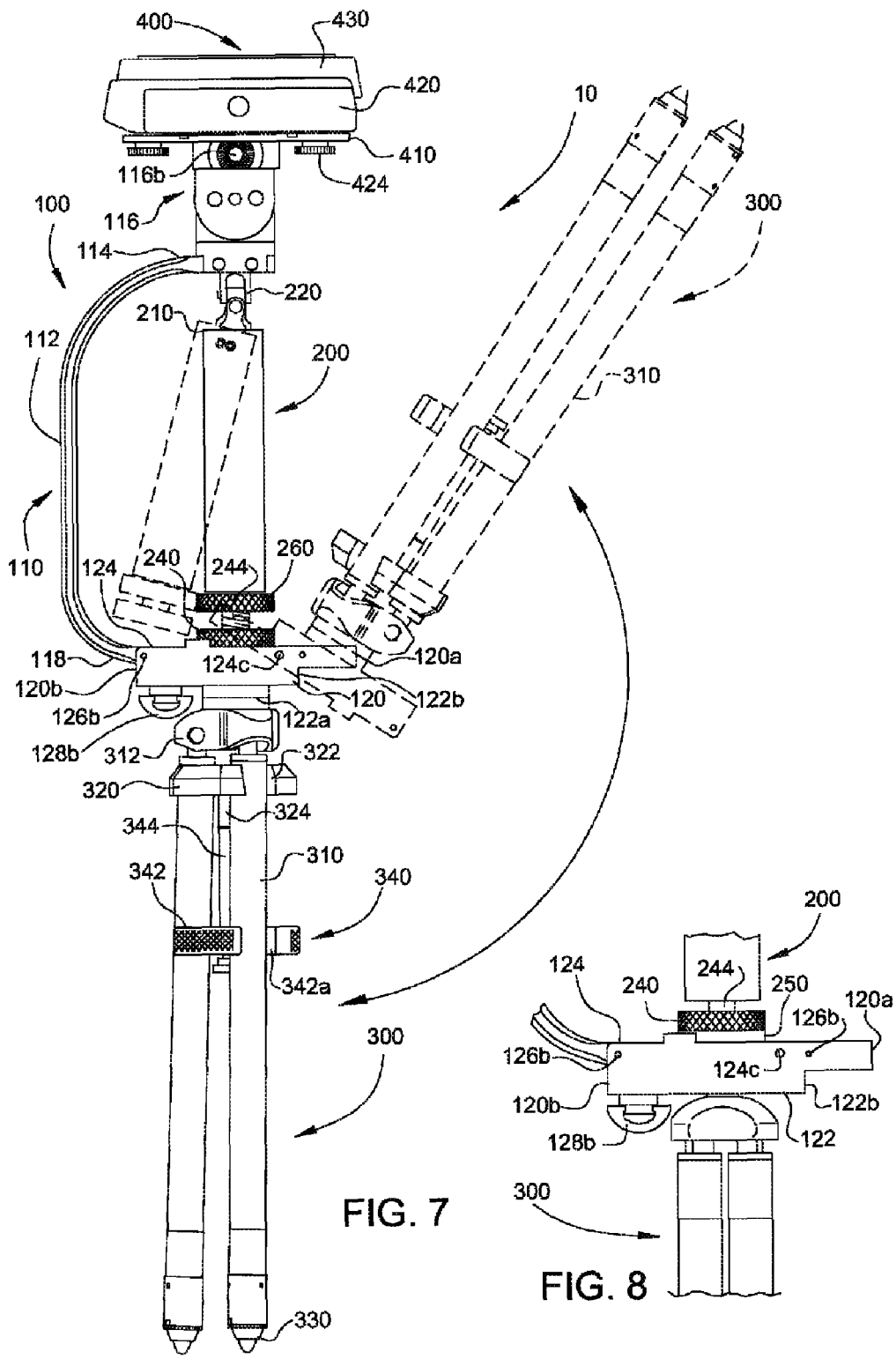

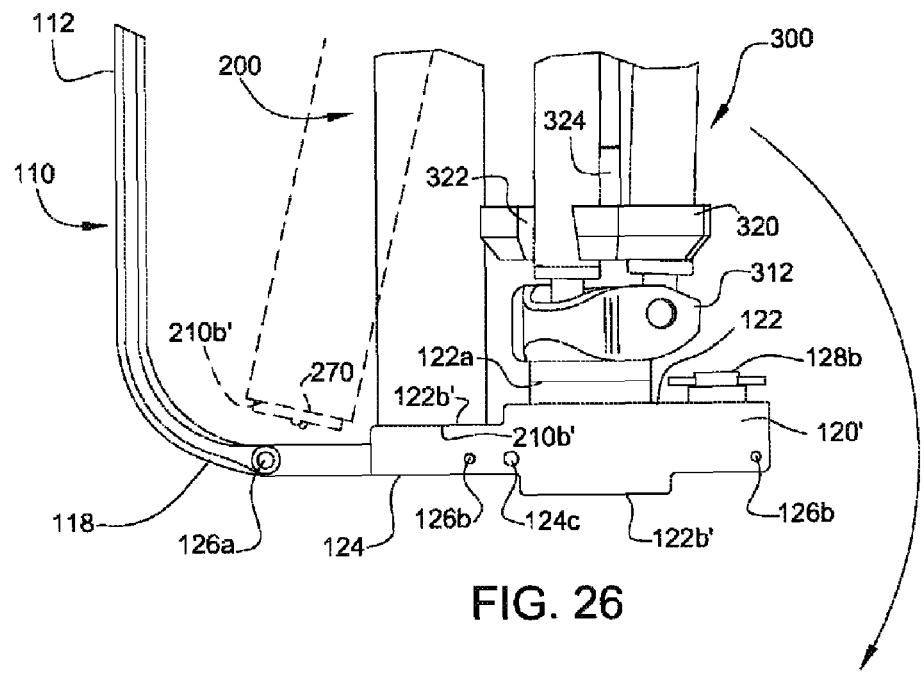
FIG. 26
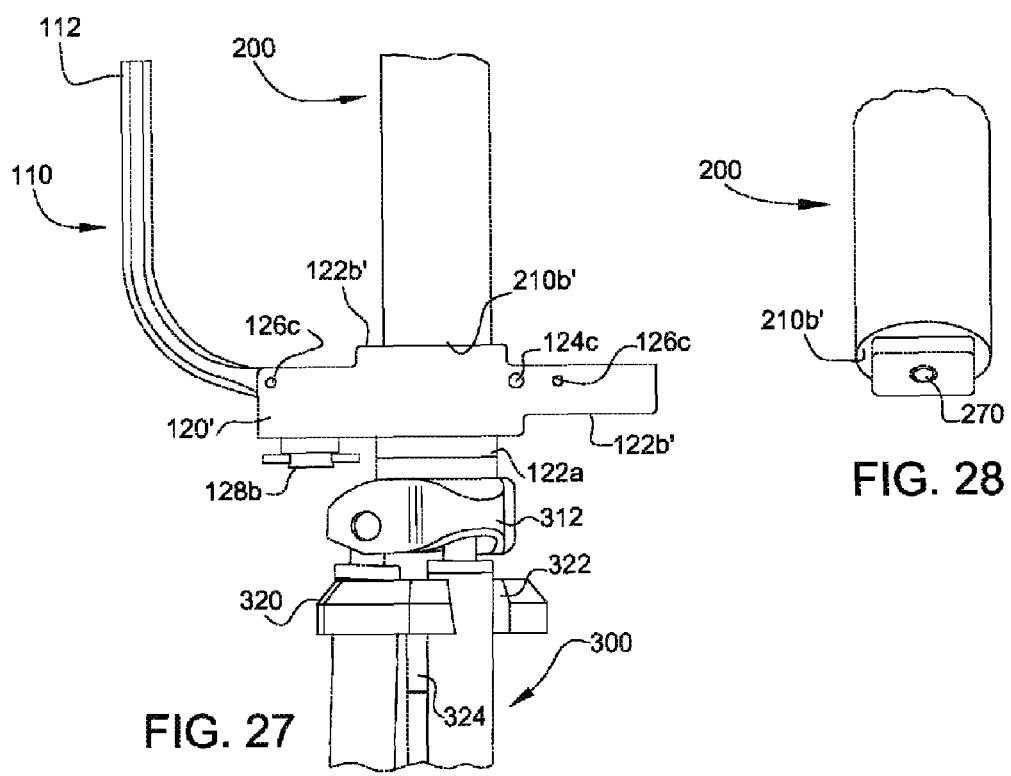
FIG. 27
FIG. 28

HAND-HELD IMAGE STABILIZATION AND BALANCING SYSTEM FOR CAMERAS

CROSS-REFERENCE TO RELATED APPLICATIONS

Not applicable.

COPYRIGHTED MATERIAL

Not applicable.

BACKGROUND OF THE INVENTION

1. Field of the Invention

The present invention relates to a hand-held image stabilization and balancing system for cameras, particularly video cameras. More specifically, the invention relates to improvements to the image stabilization and balancing system disclosed in U.S. Pat. Nos. 6,808,324 and 6,905,264, both of which are incorporated herein by reference in their entireties.

2. Related Art

Various mechanisms are known to which video cameras can be mounted to provide image stabilization and balancing, to compensate for movement of the camera during shooting.

One prior art device 10, known as Glidecam 2000 Pro, is a lightweight, hand-held, camcorder stabilizing system which allows a cameraman to shoot smooth shots even while going to extremes like running up and down stairs or traveling over rugged terrain.

The Glidecam 2000 Pro has an offset handle grip attached to a free floating Gimbal 220, which allows the user's hand to move up and down, and side to side, thereby isolating the user's hands from unwanted motions from the camera.

A camera platform moves back and forth, and side to side, to allow adjustment of the cameras horizontal balance. By varying the amount of counterweight disks on a base platform the camera's vertical balance can be adjusted.

The Glidecam 2000 Pro supports any camcorder or movie camera weighing up to 6 pounds. A small LCD monitor can be attached to a base monitor mount hole provided on the Glidecam 2000 Pro.

Another prior art device is known as Steadicam JR and is manufactured and distributed by The Tiffen Company. Steadicam JR is a compact, personal Steadicam for lightweight Compact VHS, Super VHS-C, 8 mm, Hi8, Super Hi8 and Mini DV camcorders weighing up to 4 pounds. Structurally, the Steadicam JR is similar to the Glidecam 2000 Pro and is made up of a camera platform, a gimbaled hand grip, a flat screen monitor and two folding arms. The heart of the Steadicam JR is a stabilization concept that uses weights and balances, which places the center of gravity within its free-floating, inter-gimbaled handle assembly.

Finally, another device for stabilizing a camera during shooting is a conventional tripod or monopod. These devices provide three legs, in the case of a tripod, and one leg, in the case of a monopod, to touch the ground and provide a balance for a camera attached to the top of the tripod or monopod.

The image stabilization and balancing system disclosed in U.S. Pat. Nos. 6,808,324 and 6,905,264 embodies many of the best attributes of stabilization devices and monopods in a light, compact construction. However, from the perspective of providing a compact construction, its configuration is not optimal, it requires adjustable weights for balancing, and it does not provide a way to incorporate a tripod.

It is to the solution of these and other problems that the present invention is directed.

SUMMARY OF THE INVENTION

It is accordingly a primary object of the present invention to provide an image stabilization and balancing system that has a compact construction and can be used in a variety of modes.

This and other objects are achieved by a hand-held image stabilization and balancing device for video cameras, which includes a main body part, a handle gimbaled to the main body part, means located at the bottom end of the handle for releasably locking the handle in a fixed position, a camera mounting platform, a tilting joint pivotably mounting the camera mounting platform to the main body part, a tripod, a pivoting plate pivotably mounted to the main body part, and a panning joint mounting the tripod to the pivoting plate for rotation of the tripod relative to the main body part.

The main body part includes a generally C-shaped member having a central section and upper and lower arms extending therefrom and defining a plane. The tilting joint is located at the free end of the upper arm.

The lower arm of the main body part is longer than the upper arm. The pivoting plate is pivotably mounted at the free end of the lower arm for pivoting about a pivot axis perpendicular to the plane of the C-shaped member.

The stabilization device in accordance with the present invention has a travel mode, in which it is folded for compactness, and a number of use modes, in which it can be used to stabilize a camera mounted thereon.

The use modes include a flow mode (in which the device is used for stabilization during video shooting), a stabilizer mode (in which the device is held against the user's body, either with or without a support belt), a tripod mode (in which the device is used as a conventional tripod), and a monopod mode (in which one leg of the tripod is extended and used as a conventional monopod). The stabilization device can also be used to stabilize a camera when in the travel mode.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 7 is a side elevational view of the image stabilization and balancing system in its stabilizer mode.

FIG. 8 is a partial, side elevational view of an alternate embodiment of bottom of the handgrip of the image stabilization and balancing system shown in FIGS. 1-7.

FIG. 26 is an enlarged, partial cross-sectional view of a first alternative configuration of the bottom of the hand grip and the pivoting plate, in the travel mode.

FIG. 27 is an enlarged, partial cross-sectional view of the bottom of the hand grip as shown in FIG. 26, in the tripod mode.

FIG. 28 is a perspective view of the bottom of the hand grip as shown in FIG. 26.

DETAILED DESCRIPTION OF THE PREFERRED EMBODIMENTS

Figure 3:
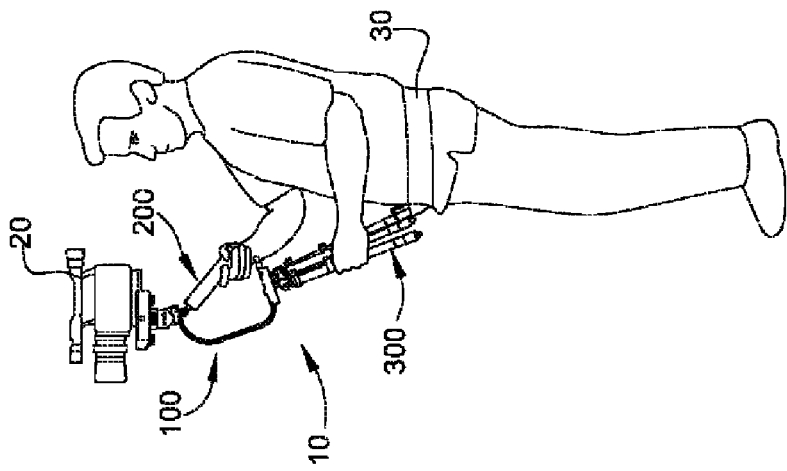
FIG. 3 is a side elevational view of the image stabilization and balancing system being used in its stabilizer mode.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 5:
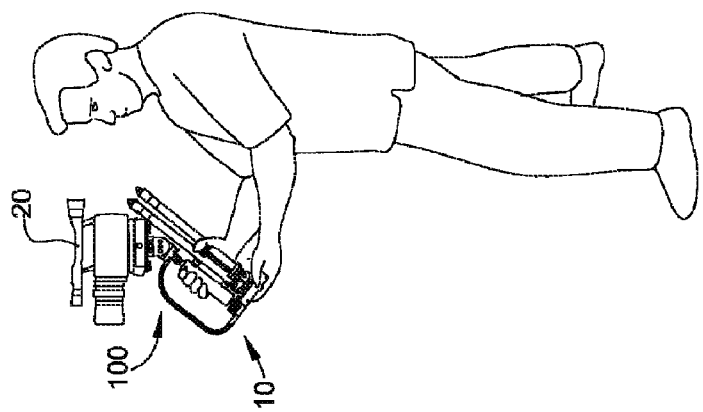
FIG. 5 is a side elevational view of the image stabilization and balancing system being used in its travel mode.

Referring first to FIGS. 1-5, the stabilization device 10 in accordance with the present invention has a travel mode (shown in FIG. 1, in which the device 10 is folded for compactness), and a number of use modes, in which it can be used to stabilize a camera 10 mounted thereon. The use modes include a flow mode (shown in FIG. 2, in which the device 10 is used for stabilization during video shooting), a stabilizer mode (shown in FIG. 3, in which the device 10 is held against the user's body, either with or without a support belt 30), a tripod mode (shown in FIGS. 4A and 4B, in which the device 10 is used as a conventional tripod), a monopod mode (shown in FIG. 4C, in which one leg of the device 10 is extended and used as a conventional monopod, a table top stand mode (shown in FIG. 36, in which the tripod is oriented sideways for use as a stand), and a body brace mode (shown in FIGS. 39 and 40, in which the device 10 is held against the user's body with the tripod oriented sideways). As shown in FIG. 5, the stabilization device 10 can also be used to stabilize a camera 10 when in the travel mode.

As best seen in FIGS. 6, 7, 9, and 10, the stabilization device 10 comprises a main body part 100, a hand grip 200, a tripod 300, and a camera mounting platform 400 mounted on the main body part 100. The main body part 100 comprises a generally C-shaped member 110 having a central section 112 and upper and lower arms 114 and 118 extending therefrom, which define a plane. The lower arm 118 is longer than the upper arm 114, for a purpose to be described hereinafter. The C-shaped member 110 can be used as a carrying handle in any of the stabilization device's modes.

Figure 13:
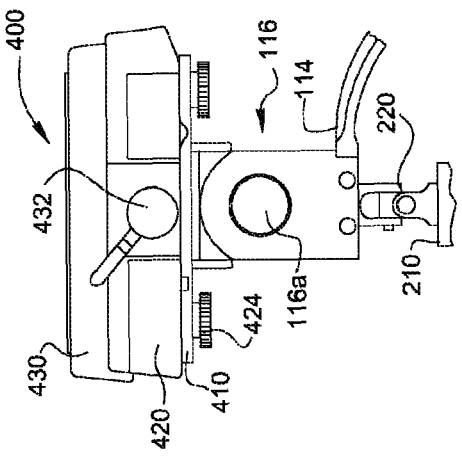
FIGS. 13 and 15 are enlarged, opposite side elevational views of the camera mounting platform and the tilting joint of the image stabilization and balancing system shown in FIGS. 1-7.
Figure 14:
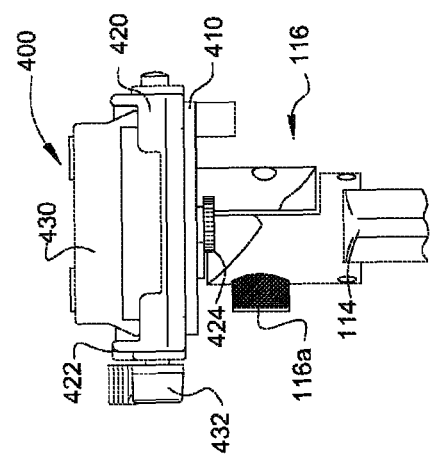
FIG. 14 is an enlarged, rear elevational view of the camera mounting platform and the tilting joint of the image stabilization and balancing system shown in FIGS. 1-7.
Figure 15:
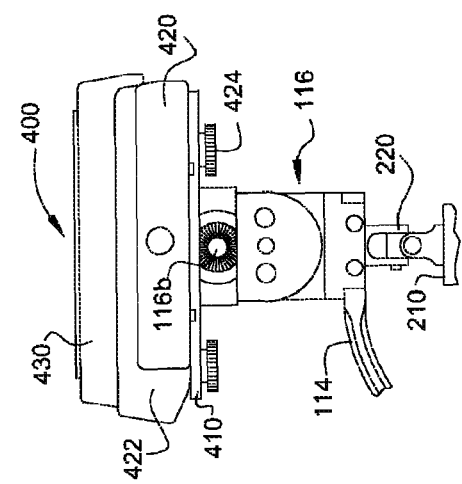
Figure 16:
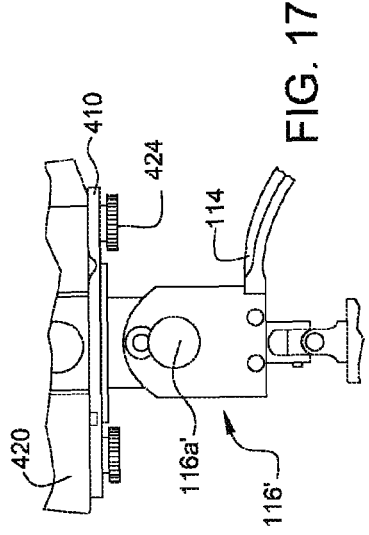
FIGS. 16 and 17 are enlarged, opposite side elevational views of an alternative embodiment of the tilting joint of the image stabilization and balancing system shown in FIGS. 1-7.
Figure 17:
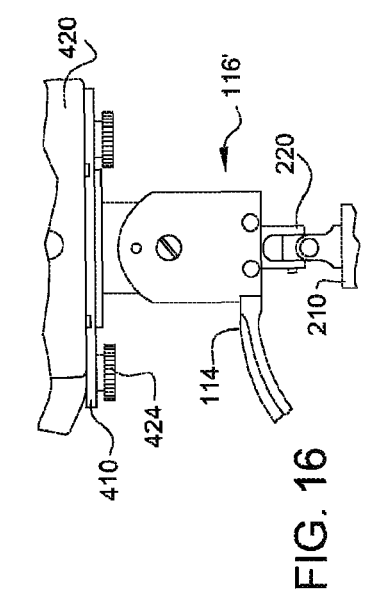
Figure 18:
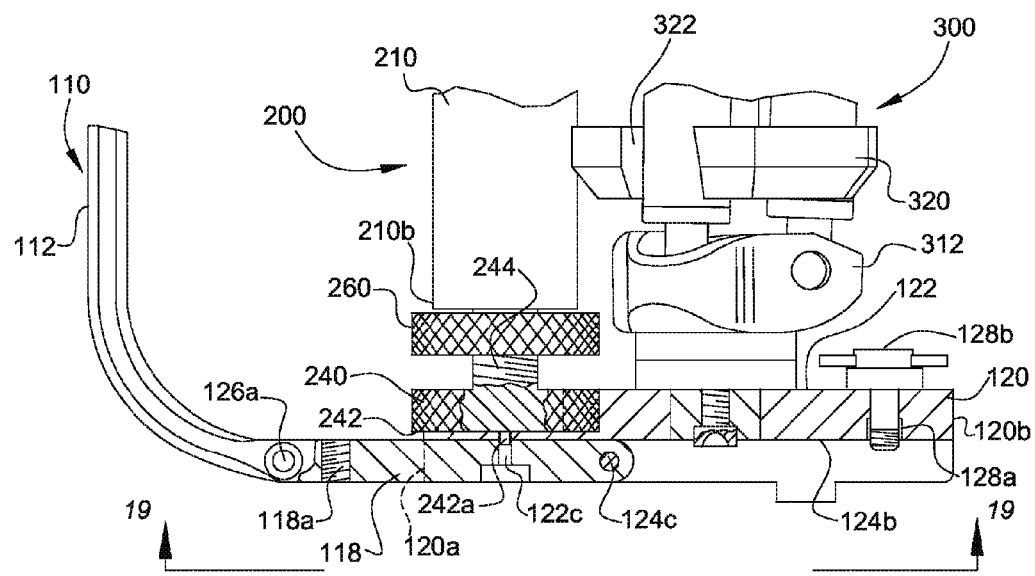
FIG. 18 is an enlarged, partial cross-sectional view of the bottom of the hand grip and the pivoting plate of the image stabilization and balancing system as shown in FIG. 7, in the travel mode.
Figure 19:
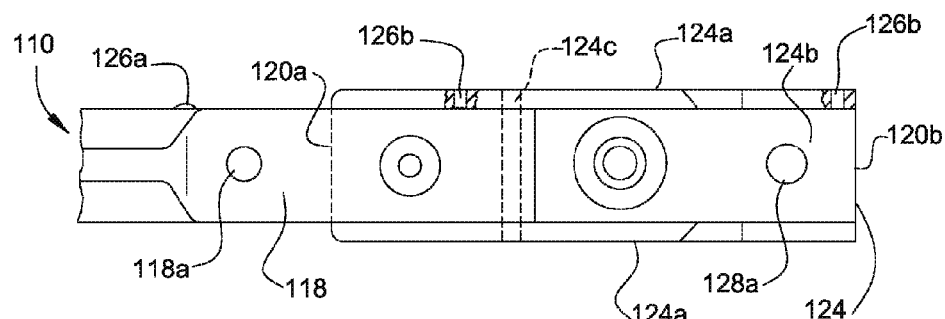
FIG. 19 is a view taken along line 19-19 of FIG. 18.
Figure 20:
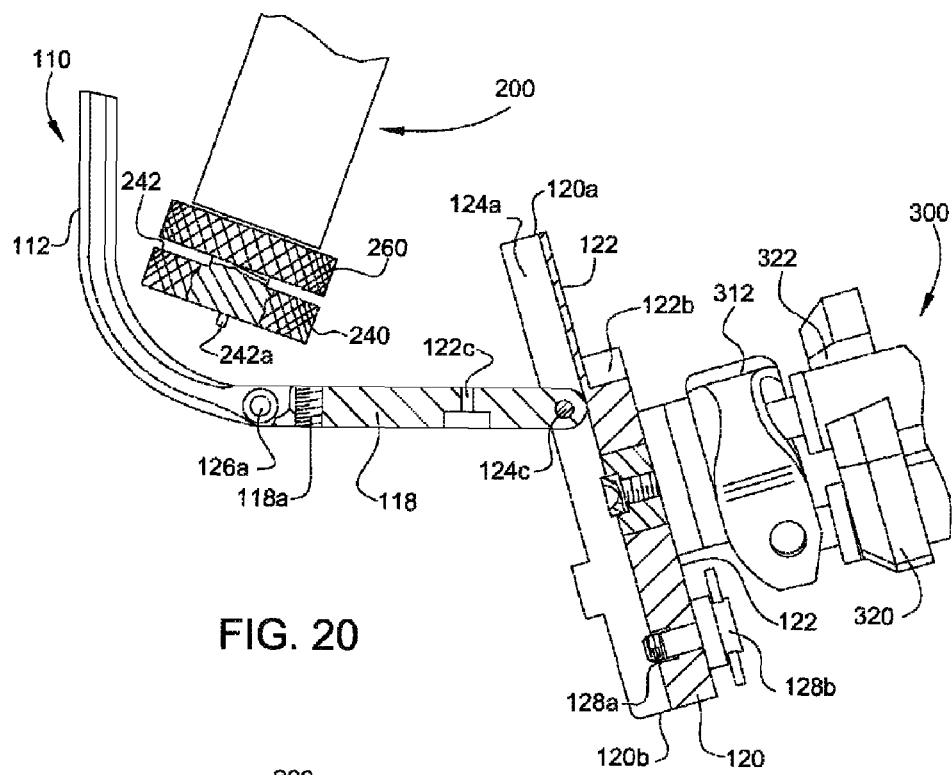
FIG. 20 is an enlarged, partial cross-sectional view of the bottom of the hand grip and the pivoting plate of the image stabilization and balancing system as shown in FIG. 7, positioned between the travel and tripod modes.
Figure 21:
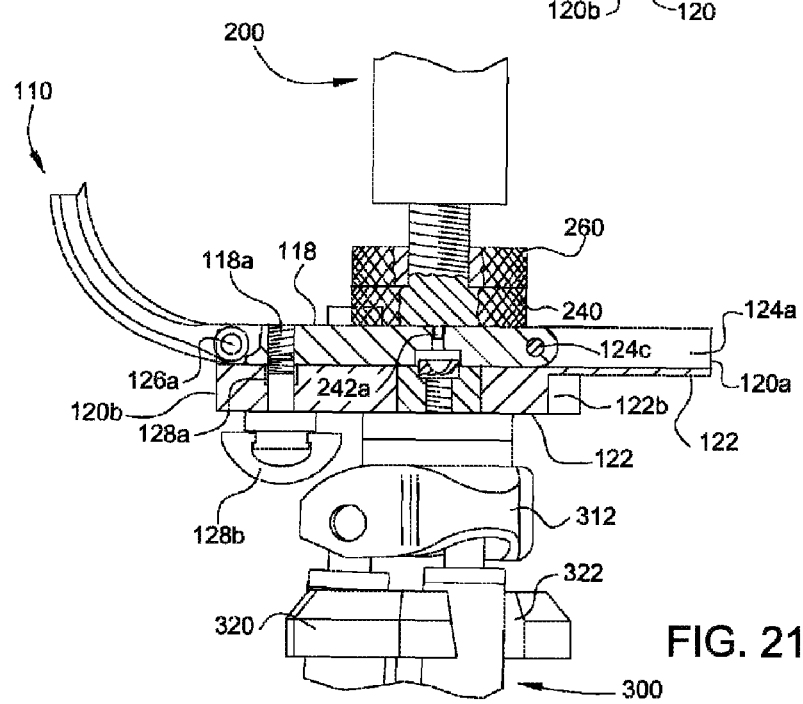
FIG. 21 is an enlarged, partial cross-sectional view of the bottom of the hand grip and the pivoting plate of the image stabilization and balancing system as shown in FIG. 7, in the tripod mode.
Figure 22:
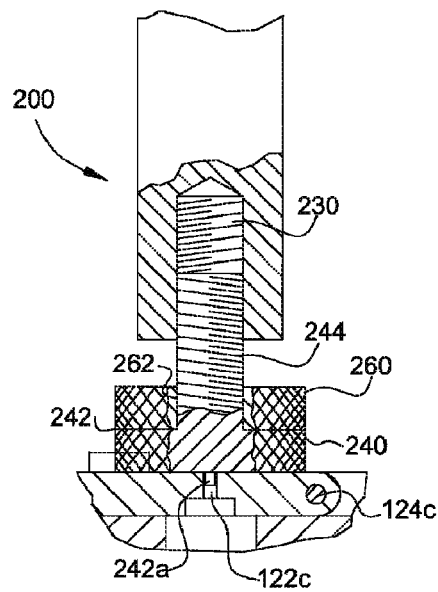
FIG. 22 is an enlarged, partial cross-sectional view of the bottom of the hand grip as shown in FIG. 7, in the tripod mode.
Figure 23:
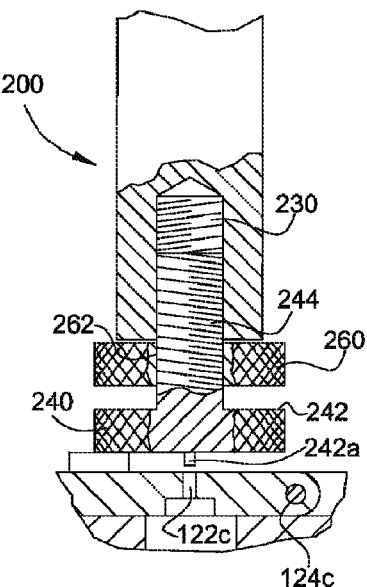
FIG. 23 is an enlarged, partial cross-sectional view of the bottom of the hand grip as shown in FIG. 7, in the flow mode.
Figure 24:
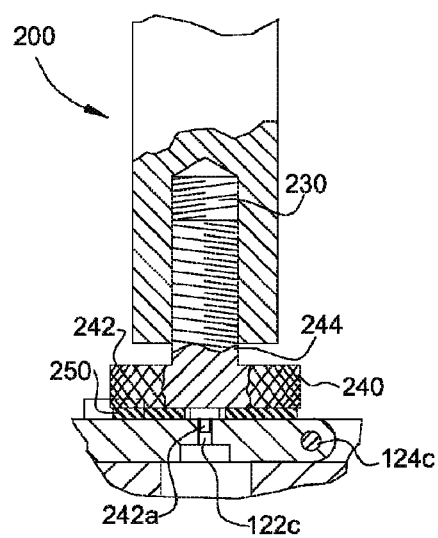
FIG. 24 is an enlarged, partial cross-sectional view of the bottom of the hand grip as shown in FIG. 8, in the tripod mode.
Figure 25:
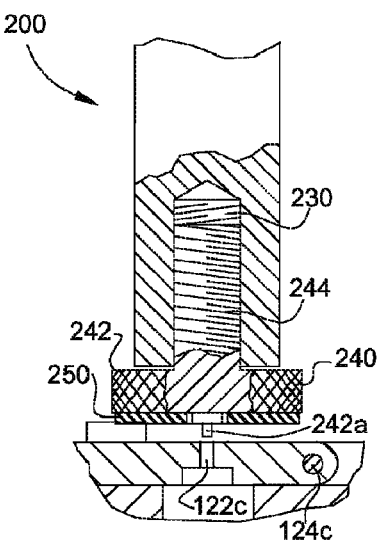
FIG. 25 is an enlarged, partial cross-sectional view of the bottom of the hand grip as shown in FIG. 8, in the flow mode.
Figure 29:
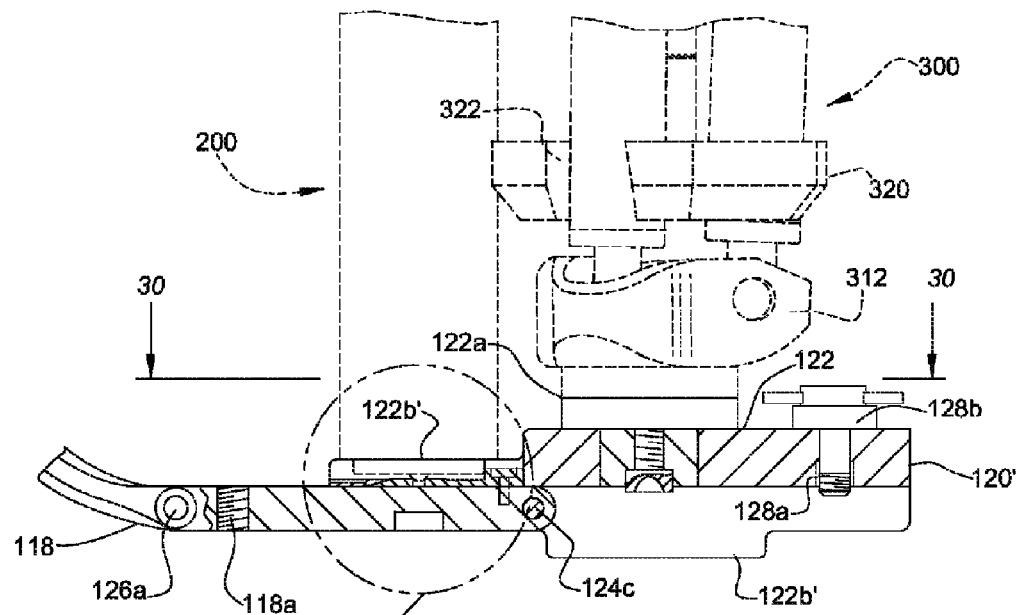
FIG. 29 is a partial cross-sectional view of the bottom of the C-shaped member and the pivoting plate with the hand grip as shown in FIG. 26.
Figure 30:
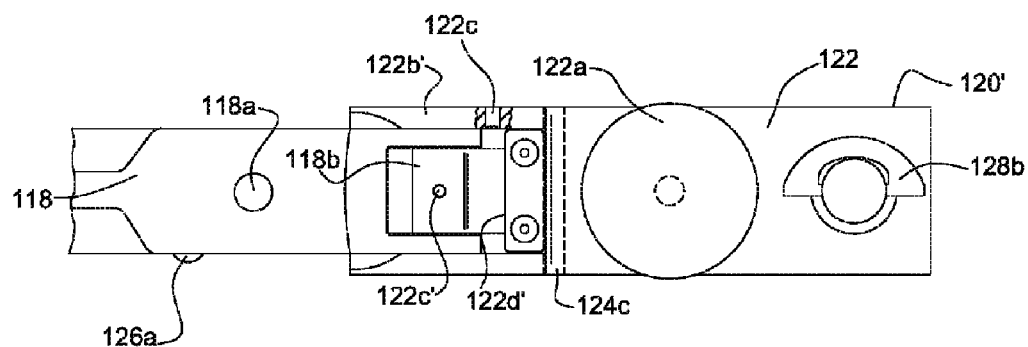
FIG. 30 is a view taken along like 30-30 of FIG. 29.
Figure 31:
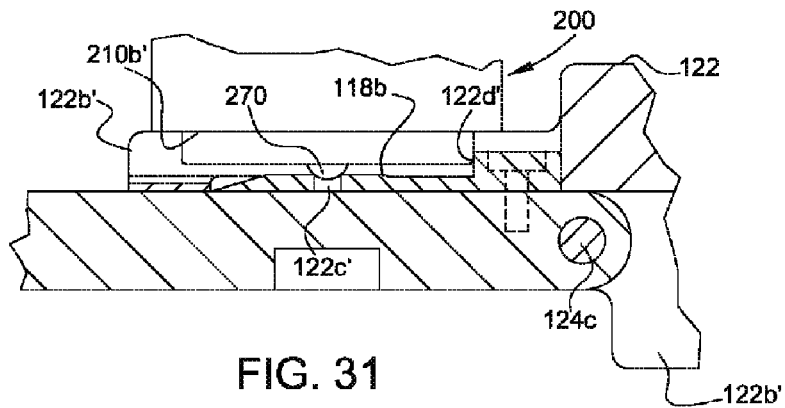
FIG. 31 is an enlarged view of the area designated 31 in FIG. 29.
Figure 32:
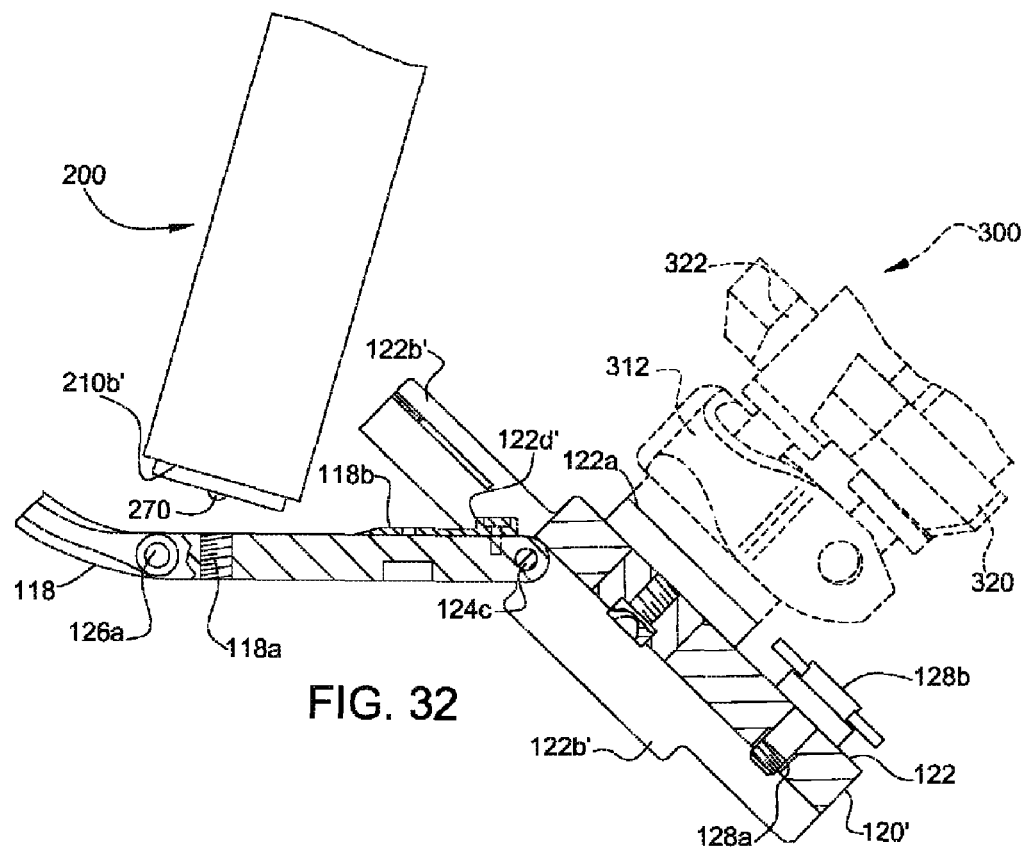
FIG. 32 is an enlarged, partial cross-sectional view of the bottom of the hand grip and the pivoting plate of the image stabilization and balancing system as shown in FIG. 26, positioned between the travel and tripod modes.
Figure 33:
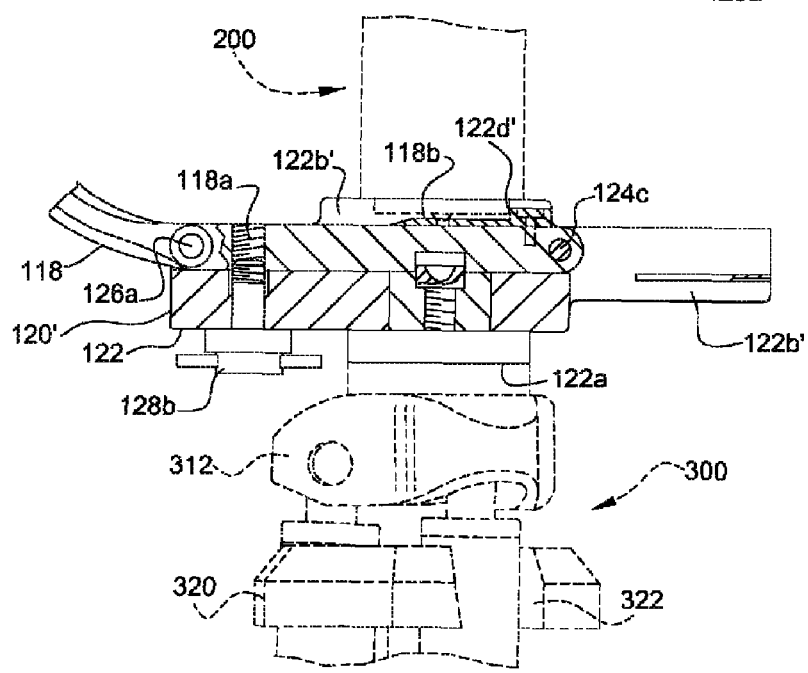
FIG. 33 is an enlarged, partial cross-sectional view of the bottom of the hand grip and the pivoting plate of the image stabilization and balancing system as shown in FIG. 26, in the tripod mode.
Figures 34, 35:
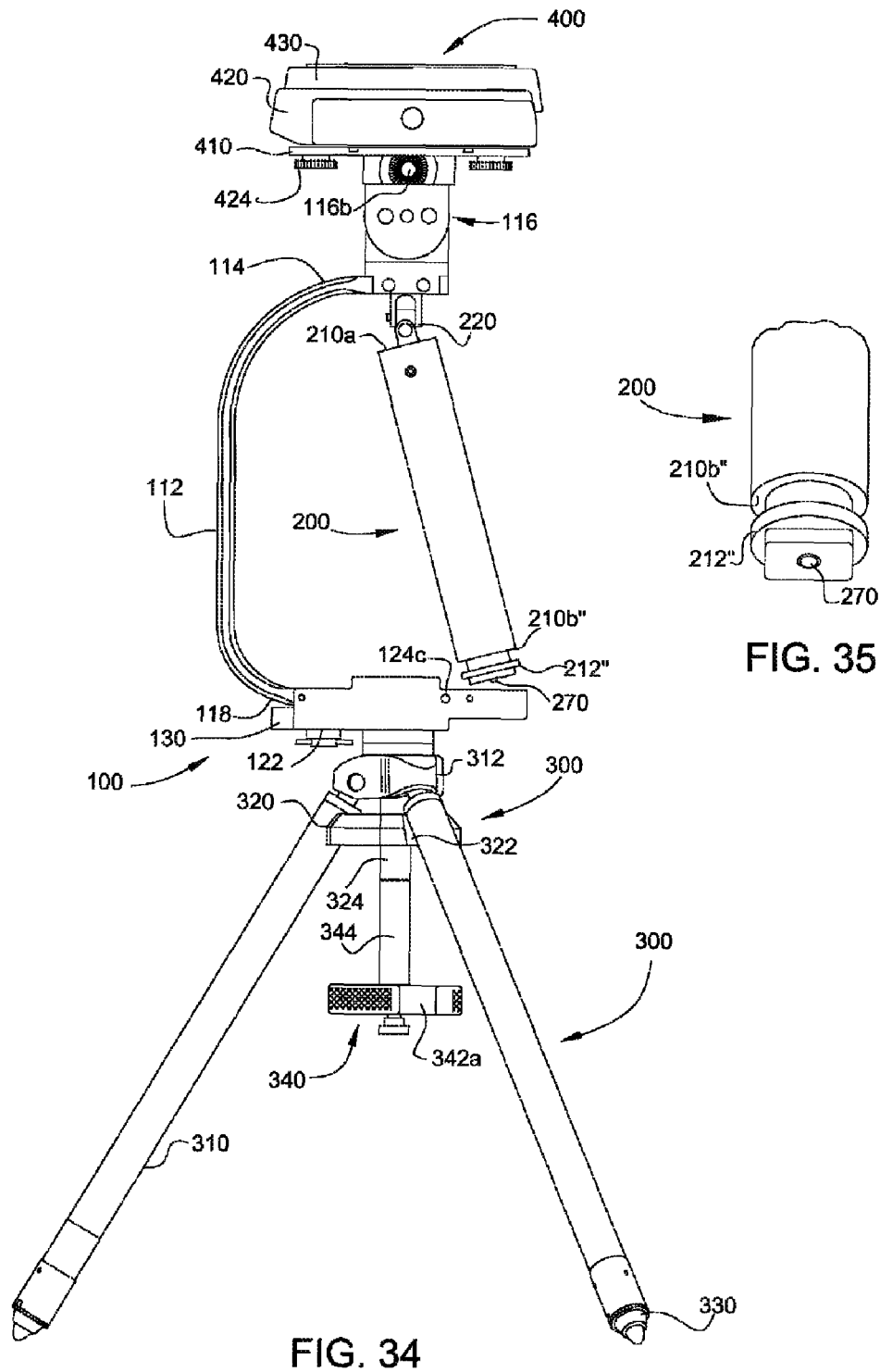
FIG. 34 is a side elevational view of the image stabilization and balancing system in its tripod mode, with a second alternative configuration of the bottom of the hand grip.
FIG. 35 is a perspective view of the bottom of the hand grip as shown in FIG. 34.

Referring now to FIGS. 13-15, the upper arm 114 terminates at its free end in a fluid-head tilting joint 116 to which the camera mounting platform 400 is mounted for tilting about a tilt axis perpendicular to the plane of the C-shaped member 110 (for example, for video recording or general positioning), while the lower arm 118 terminates at its free end in a pivoting plate 120 to which the tripod 300 is mounted. The tilting joint 116 is provided with a rotatable knob 116*a* for adjusting its tension and locking it in place. An alternative embodiment, in which the tilting joint 116' is provided with a rotatable knob 116*a*' for adjusting its tension and locking it in place is shown in FIGS. 16 and 17. In another alternative embodiment, shown in FIG. 9A, the tilting joint is omitted, and the camera mounting platform 400 is mounted directly to the upper arm 114 of the C-shaped member 110.

The camera mounting platform 400 can be similar to that disclosed in U.S. application Ser. No. 12/385,218, filed Apr. 1, 2009, which is incorporated herein by reference in its entirety, or to that disclosed in U.S. Pat. Nos. 6,808,324 and 6,905,264. As explained above, the camera mounting platform 400 is mounted on the main body part 100 by the tilting joint 116, which permits tilting of the camera mounting platform 400 about a tilt axis perpendicular to the plane of the C-shaped member 110. The tension of the tilting joint 116 (that is, its resistance) is adjusted via the rotatable knob 116*a*, which also locks the tilting joint 116 in place.

The camera mounting platform 400 also includes a base plate 410, a middle plate 420, and an upper plate 430. The base plate 410 is fixed to the tilting joint 116. The middle plate 420 is slidably mounted on the base plate 410 for motion in a direction parallel to the tilt axis of the tilting joint 116, and includes side walls 422 extending perpendicular to its sliding direction for slidably mounting the upper plate 430 therein for motion in a direction perpendicular to the tilt axis of the tilting joint 116. The camera mounting platform 400 thus provides for adjustment of the camera's position in the X and Y planes. As shown in FIGS. 6, 7, 9, and 13-17, thumbscrews 424 are provided for locking the middle plate 420 in position relative to the fixed base plate 410; and as shown in FIGS. 14 and 15, a locking lever 432 is provided for locking the upper plate 430 in position relative to the middle plate 420.

As will be appreciated by those of ordinary skill in the art, other configurations of camera mounting platforms can also be used. The manner in which a camera 10 is mounted on the camera mounting platform 400 is described in U.S. Pat. Nos. 6,808,324 and 6,905,264. Fore-aft balance of the video camera 10 is conventionally achieved as described in U.S. Pat. Nos. 6,808,324 and 6,905,264. A further description is found in Published U.S. Application No. US 2009-0263118 A1, published Oct. 22, 2009, which is also incorporated herein by reference in its entirety.

The pivoting plate 120 has first and second ends 120*a* and 120*b*, a tripod-mounting surface 122, and a channel surface 124. The tripod-mounting surface 122 is provided with a fluid-head panning joint 122*a* for mounting the tripod 300 thereto. The panning joint 122*a* permits fluid-head panning for recording video or general positioning. In addition, the tripod-mounting surface 122 has a cutaway portion 122*b* adjacent the first end 120*a*, for a purpose to be described hereinafter.

The channel surface 124 is formed as a channel with opposed side walls 124*a* extending vertically from the channel floor 124*b*. The lower arm 118 of the C-shaped member 110 is hinged in the channel for pivoting 180° about a pivot axis 124*c* perpendicular to the channel side walls 124*a*, between a travel position and a use position. The pivot axis 124*c* is positioned so that in the use position (which is the position of the pivoting plate 120 in all modes except the travel mode), substantially the entire length of the lower arm 118 engages the channel; and in the travel position (which is the position of the pivoting plate 120 in the travel mode), only the portion adjacent the end of the lower arm 118 engages the channel.

Preferably, at least one side edge of the lower arm 118 is provided with a detent 126*a* and the side wall of the channel is provided with mating recesses or apertures 126*b* on either side of the hinge, for engaging the detent 126*a* and retaining the lower arm 118 in the channel in both the use and travel positions. The lower arm 118 and the pivoting plate 120 can also be provided with respective aligned apertures 118*a* and 128*a* for receiving a locking screw 128*b* adjacent the second end 120*b* of the pivoting plate 120, to lock the lower arm 118 and the pivoting plate 120 together in the use position. Preferably, the aperture 118*a* in the lower arm 118 is internally threaded. The aperture 128*a* in the pivoting plate 120 need not be threaded, but preferably is configured to retain the locking screw 128*b* therein.

The hand grip 200 is generally similar in construction to that disclosed in U.S. Pat. Nos. 6,808,324 and 6,905,264, in that its upper end 210*a* is gimbaled and its free lower end 210*b* can be locked in place by a locking mechanism. In particular, the upper end 210*a* is mounted to the inner surface of the upper arm 114 by a gimbal 220, similar to that disclosed in U.S. Pat. Nos. 6,808,324 and 6,905,264, so that the hand grip 200 is rotatable about X, Y, and Z axes.

In one embodiment, the lower end 210*b* of the hand grip 200 has an internally threaded bore 230 for receiving a thumbscrew 240. The head 242 of the thumbscrew 240 includes a small axial projection 242*a*, for a purpose to be described hereinafter. The thumbscrew 240 is rotatable to cause movement of its head 242 along the longitudinal axis of the hand grip 200 between a use position closest to the lower end of the hand grip 200 and a travel position farthest from the lower end of the hand grip 200. Optionally, as shown in FIG. 7, a rubber washer 250 can be provided on the head 242 of the thumbscrew 240, to provide additional friction between the hand grip 200 and the pivoting plate 120. When the rubber washer 250 is provided, then the axial projection 242*a* extends through the rubber washer 250.

Also optionally, a locking disc 260 with an internally threaded bore 262 can be threaded onto the shaft 244 of the thumbscrew 240 between the lower end of the hand grip 200 and the head 242 of the thumbscrew 240. The locking disc 260 is rotatable on the thumbscrew shaft 244 independent of the rotation of the thumbscrew 240, to keep the thumbscrew 240 tightened in the travel position. The combined length of the gimbal 220, the hand grip 200, and the thumbscrew 240 in its use position is less than the distance between the inner surfaces of the upper and lower arms 114 and 118, so that the hand grip 200 can swing freely when the pivoting plate 120 is in either the use or the travel position. When the pivoting plate 120 is in its travel position, the thumbscrew 240 can be rotated into its travel position to come into locking engagement with the cutaway portion 122*b* of the tripod-receiving surface, which is complementary in shape to the head 242 of the thumbscrew 240.

Another embodiment of the locking mechanism for the hand grip 200 is shown in FIGS. 26-33. In this embodiment, the lower end 210b' of the hand grip 200 is necked in, and the thumbscrew 240 and the washer 250 or the locking disc 260 are replaced by a spring-loaded ball plunger (detent) 270, which projects slightly from the necked in lower end 210b'. The lower arm 118 of the C-shaped member 110 is provided on its upper surface with a raised plate 118b having a mating recess 122c' therein for engaging the spring-loaded ball plunger (detent) 270. In this embodiment, a pivoting plate 120' is provided in which the cutaway portion 122b of the pivoting plate 120 is replaced with two opposed side walls 122b' for capturing the necked-in lower end 210b' of the handle grip 200 and preventing the hand grip 200 from rotating. In addition, the pivoting plate 120' is cut out between the side walls 122b' to allow the hand grip 299 to engage the raised plate 118b and to provide an end wall 122d' to engage the necked-in lower end 210b' of the handle grip 200.

When the pivoting plate 120' is in its travel position and the hand grip 200 is positioned to align the spring-loaded ball plunger (detent) 270 with the mating recess 122c', the spring-loaded ball plunger (detent) 270 engages the mating recess 122c' to lock the hand grip 200 in place. The spring-loaded ball plunger (detent) 270 retracts under sufficient pressure to release the hand grip 200. The combined action of the three-sided square-end capture and spring-loaded ball plunger (detent) 270 provides a one-step "quick-lock/quick-release" locking mechanism. This alternative hand grip can also lock position in the unfolded tripod, monopod, or stabilizer modes by means of engaging two additional vertical walls on the pivoting plate and the previously mentioned mating recess and third vertical wall on the sloped and stepped plate located at the base of the C-shaped member. The hand grip 200 is engaged or disengaged with moderate pressure toward or away from the mating recess, entering and exiting from the direction of the closed side of the C-shaped member.

The tripod 300 has three legs 310 of conventional telescoping construction. The legs 310 are jointed at their upper ends to a conventional tripod base 312 to pivot radially outwardly therefrom into first and second deployed positions. A leg-locking disc 320 is attached to the bottom of the tripod base 312 at the upper ends of the legs 310, and is provided with circumferential recesses 322 corresponding to the legs 310, for engaging the upper ends of the legs 310 via snap fit. A center post 324 extends below the tripod base 312 from the bottom of the leg-locking disc 320, perpendicular thereto, for a purpose to be described hereinafter. Each tripod leg 310 terminates at its bottom end in a conventional rubber foot 330 used to obtain sure footing when the stabilization device 10 is used in a tripod mode.

In addition to the conventional telescoping construction, the legs 310 can include a bottom, second stage, which can be extended separately from conventional telescoping construction, to allow the user to have greater individual control over the length of each leg 310. An example of this two-stage construction is found in Varizoom Lens Control's model VZ-TK65 tripod 300.

The tripod 300 can also be used to removably store a handle 340 for attachment to the camera mounting platform 400. The handle 340 has a knob 342 and a shaft 344 extending from the knob 342. The end of the shaft 344 has external threads 344a, which can be engaged with either a threaded bore 324a in the free end of the center post 324 or a threaded bore 116b on the side of the tilting joint 116. The knob 342 has three circumferential, leg-receiving recesses 342a, which respectively receive the tripod legs 310 when the handle 340 is attached to the underside of the leg locking disc 320, and the tripod legs 310 are in the travel and stabilizer modes. The knob 342 also has a shallow circumferential recess 342b between two of the circumferential, leg-receiving recesses 342a, for receiving the handgrip when the stabilization device 10 is in the travel mode.

Still further, the knob 342 can be configured for the selective attachment of an auxiliary lever 350 for adjusting the position of the camera mounting platform 400. For example, the auxiliary lever 350 can be configured as an elongated rod having an externally threaded end 352, and the knob 342 can be provided with an internally threaded bore 342c extending radially inwardly from its circumference for removably receiving the externally threaded end 352 of the rod.

Figure 36:
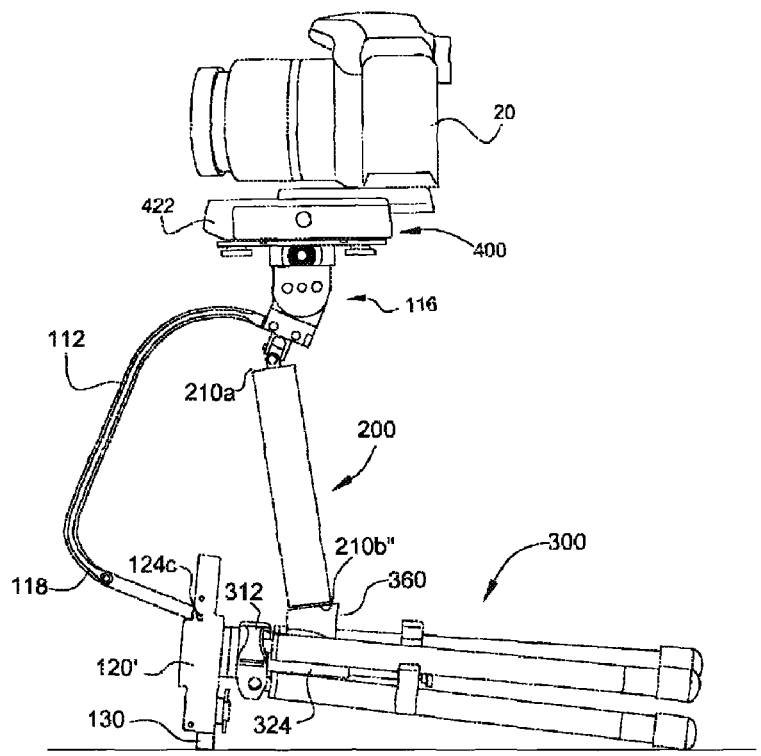
FIG. 36 is a side elevational view of the image stabilization and balancing system in its table top stand mode, employing the hand grip as shown in FIG. 34.
Figure 37:
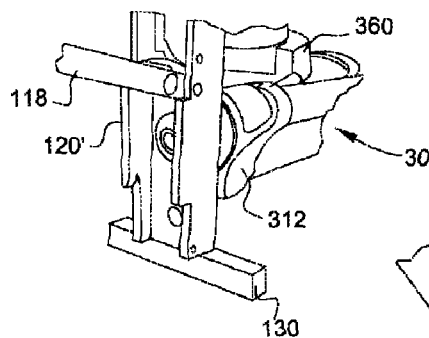
FIG. 37 is a partial perspective view of the pivoting plate and the upper end of the tripod of the image stabilization and balancing system positioned in the table top stand mode as shown in FIG. 36.
Figure 38:
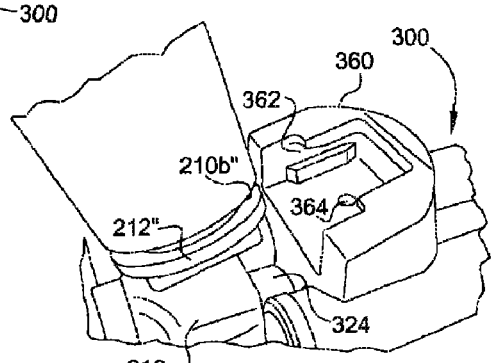
FIG. 38 is an enlarged, partial perspective view of the bottom of the embodiment of the handgrip shown in FIG. 34, moved out of the use position.

The tripod 300 can also be used on its side as a stand or as a brace, as shown in FIGS. 36-38. In order for the tripod 300 to be used as a stand, a lateral support bar 130 is fastened (preferably removably, using a fastener such as a screw or a bolt) to the second end 120b of the pivoting plate 120, the hand grip 200 is provided with a necked-in lower end 210b", which is similar to the necked-in lower end 210b' but which additionally is provided with a flange 212", and a socket 360 is mounted to the center post 324 of the tripod 300, above the leg-locking disc 320, to receive the flanged, necked-in lower end 210b". The lateral support bar 130 provides side-to-side stability, while the tripod legs 310 offer front-back stability. The socket 360 includes a grooved slot 362 complementary in shape to the flanged, necked-in lower end 210b", as well as a mating recess 364 for matingly engaging the detent 270.

As will be appreciated by those of skill in the art, a monopod similar to that disclosed in U.S. Pat. Nos. 6,808,324 and 6,905,264 can be substituted for the tripod 300; but the storage location for the handle 340 is then lost.

In the travel, tripod, and stabilizer modes, the hand grip 200 is secured to the body, the tripod 300 is retracted and the pivoting plate 120 is pivoted so the retracted tripod 300 is parallel to the hand grip 200, and the camera mounting platform 400 is tilted to provide clearance for the tripod 300. It will be appreciated that with the lower arm 118 of the C-shaped member 110 being longer than the upper arm 114, the tripod 300 can be pivoted so that its legs 310 are adjacent to the hand grip 200 in a particularly compact configuration.

To change the stabilization device 10 from its travel mode to its flow mode, the locking disc 260 and the thumbscrew 240 must be rotated out of their travel position to disengage from the cutaway portion 122b of the tripod surface. The hand grip 200 can then be pivoted on the gimbal 220 away from the lower arm 118 of the body member so that it no longer obstructs pivoting movement of the pivoting plate 120. The pivoting plate 120 can then be pivoted to bring the channel surface 124 into engagement with the lower surface of the lower arm 118. As explained above, an externally threaded locking screw 128b disposed in the threaded aperture 118a through the lower arm 118 is rotatable to engage the aligned, threaded aperture 128a in the pivoting plate 120, to secure the pivoting plate 120 in the use position.

Figure 2:
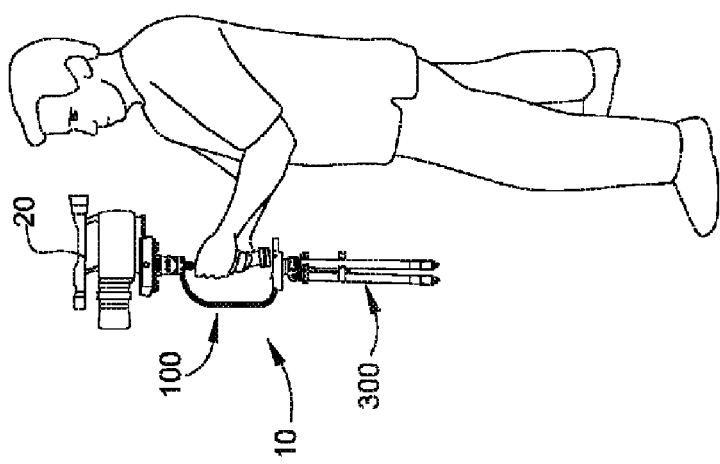
FIG. 2 is a side elevational view of the image stabilization and balancing system being used in its flow mode.
Figure 1:
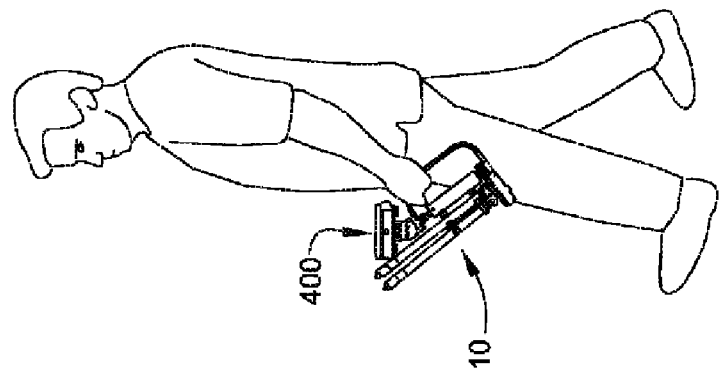
FIG. 1 is a side elevational view of the hand-held image stabilization and balancing system in accordance with the present invention being carried by a user in its travel mode.
Figure 4C:
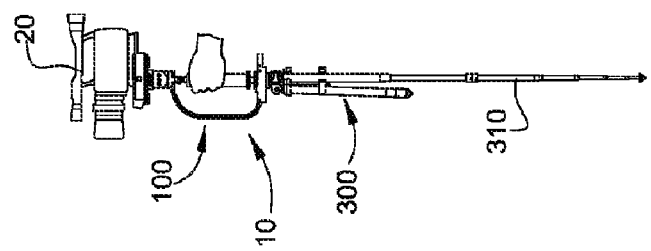
FIG. 4C is a side elevational view of the image stabilization and balancing system being used in its monopod mode.
Figure 4B:
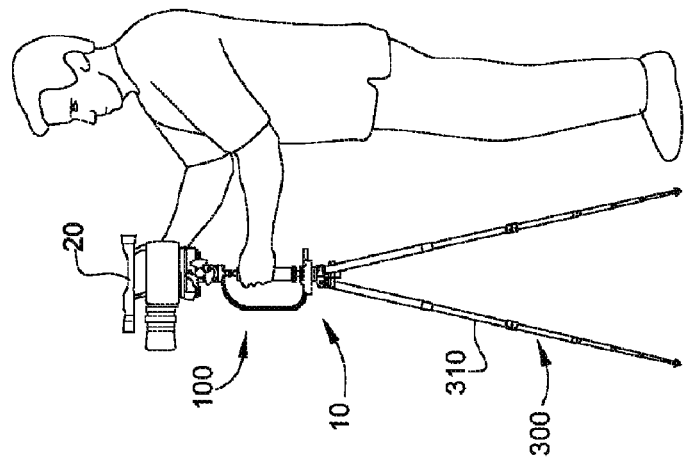
FIG. 4B is a side elevational view of the image stabilization and balancing system being used in its tripod mode, with its legs extended.
Figure 4A:
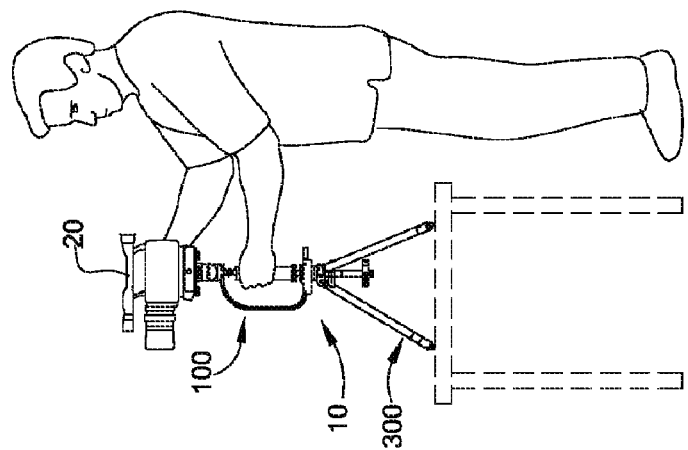
FIG. 4A is a side elevational view of the image stabilization and balancing system being used in its tripod mode, with its legs retracted.
Figure 6:
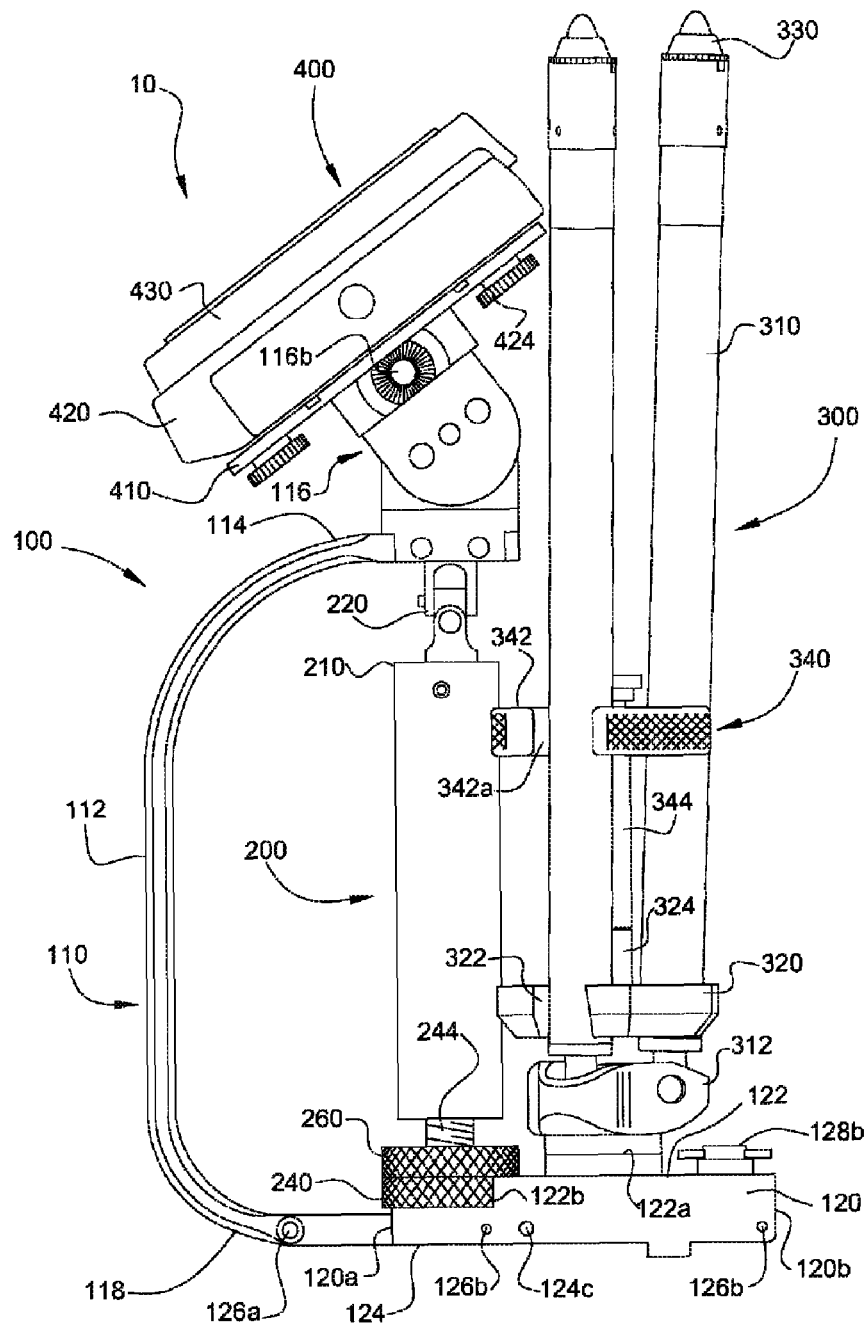
FIG. 6 is an enlarged side elevational view of the image stabilization and balancing system in its travel mode.
Figures 9, 9A, 11:
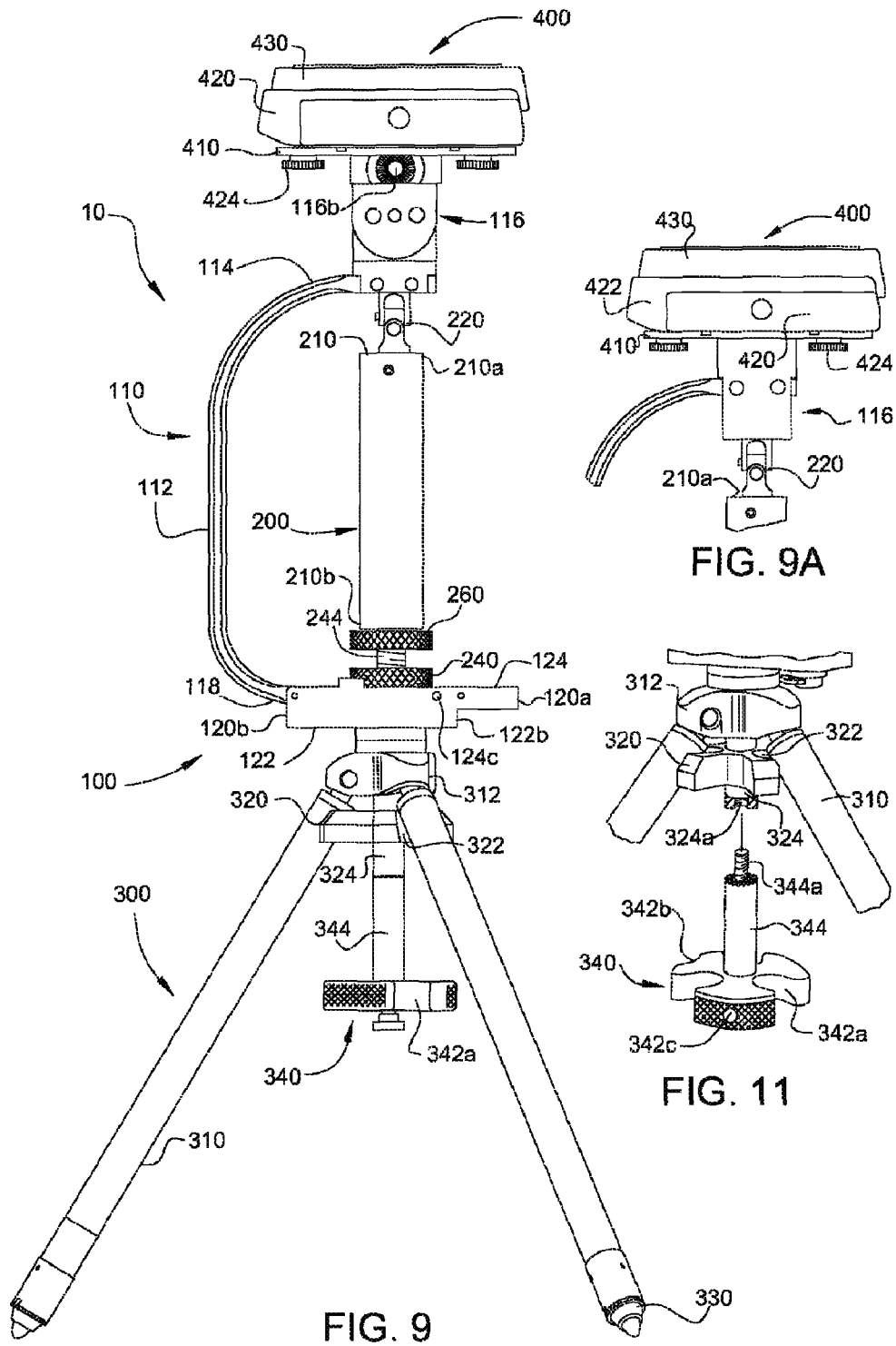
FIG. 9 is a side elevational view of the image stabilization and balancing system in its tripod mode, with its legs retracted, and with the hand grip in the storage position.
FIG. 9A is a partial side elevational view of the image stabilization and balancing system, showing an alternative embodiment of the joint between the camera mounting platform and the main body part.
FIG. 11 is an enlarged, partial perspective view of the removable handle as shown in FIG. 8.
Figures 10, 12:
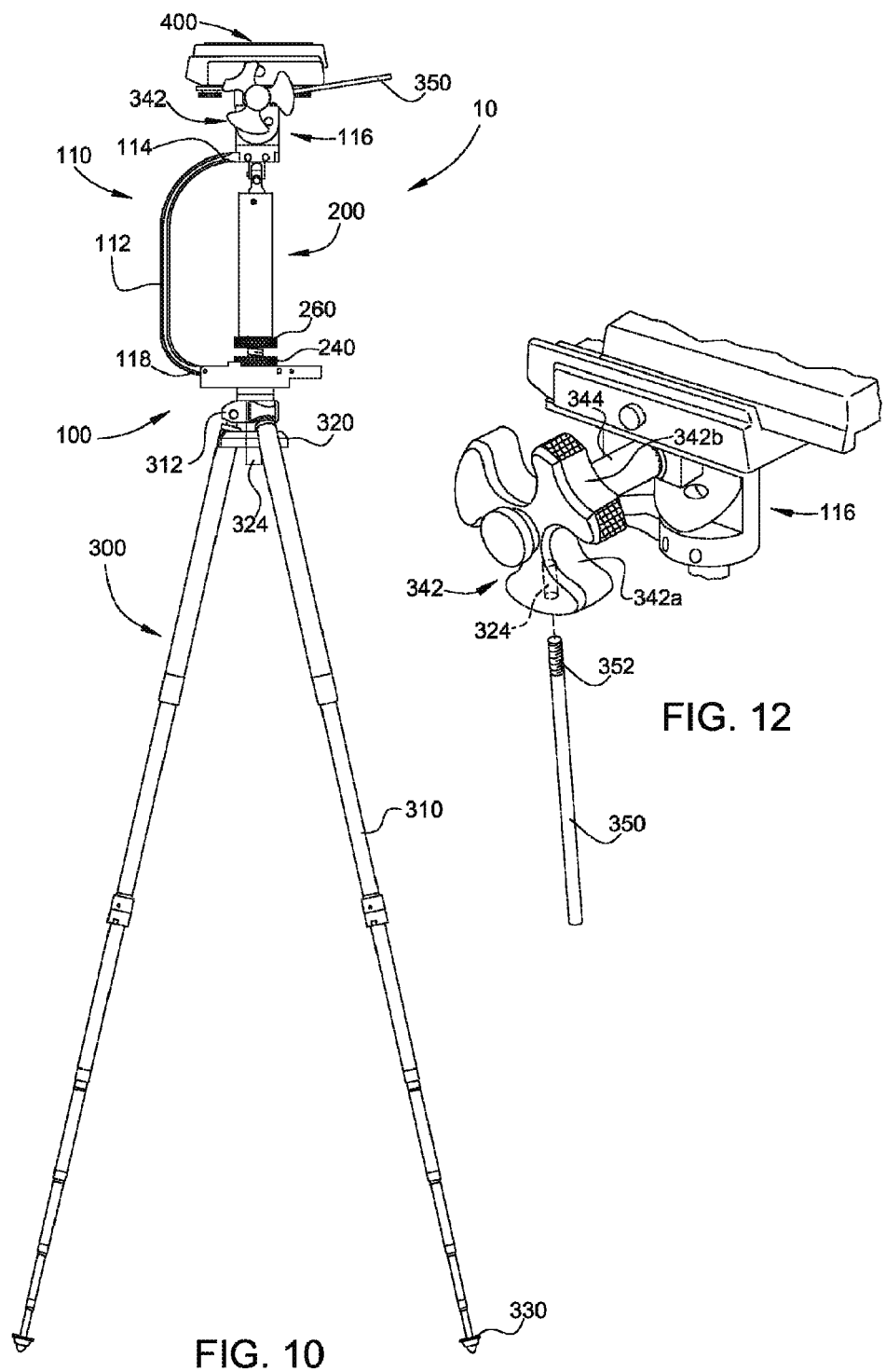
FIG. 10 is a side elevational view of the image stabilization and balancing system in its tripod mode as shown in FIG. 9, with its legs extended, and with the hand grip in the use position.
FIG. 12 is an enlarged, partial perspective view of the removable handle as shown in FIG. 9.

Once the pivoting plate 120 has been secured in the use position, a camera 10 can be mounted on the camera mounting platform 400, and the stabilization device 10 can be used in the tripod mode, as shown in FIGS. 4A and 4B, the monopod mode, as shown in FIG. 4C, or in the flow and stabilizer modes, as shown in FIGS. 2 and 3.

The stabilization device 10 can also be used like a conventional tripod or a conventional monopod. This is accomplished by moving the hand grip 200 into the position shown in FIGS. 4A-4C, 7, and 9. Initially, the locking disc 260 and the thumbscrew 240 are rotated to move into the use position, thus providing clearance for the thumbscrew 240 to move into alignment with the cutaway portion 122b of the tripod surface. The thumbscrew 240 can then be rotated to move downward and into engagement with the cutaway portion 122b, with the axial projection 242a engaging an aligned aperture 122c in the cutaway portion 122b. Once the position of the hand grip 200 is fixed by the thumbscrew 240 or the detent 270, the tripod legs 310 can be adjusted for use in a tripod mode or a monopod mode.

For use in the tripod mode, the tripod legs 310 are deployed by unlocking them from the leg locking disc 320, pivoting them outward, and extending them as appropriate to adjust their length. For use in the monopod mode, the tripod legs 320 remain locked in the leg locking disc 320, and one of the tripod legs 320 is extended to operate as a conventional monopod.

Figure 39:
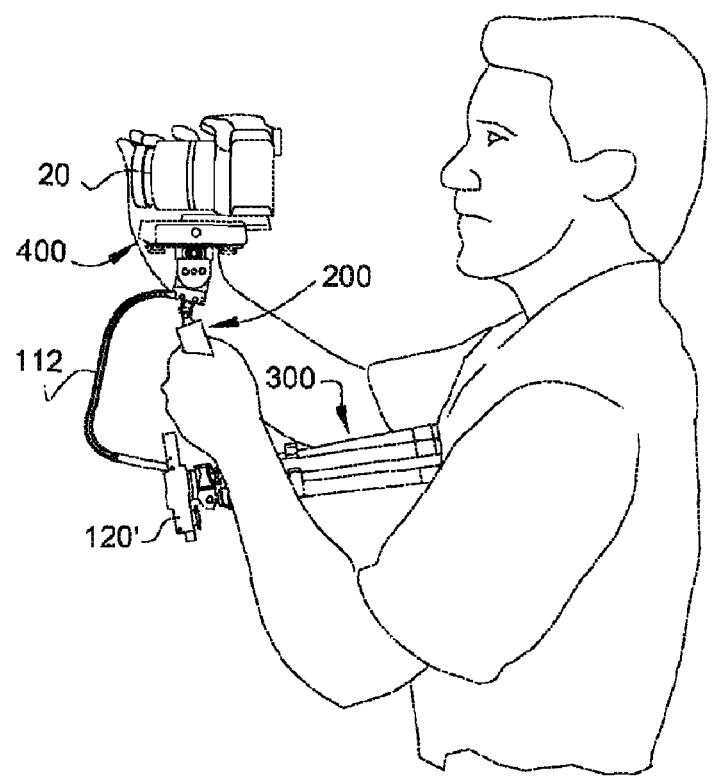
FIG. 39 is a side elevational view of the image stabilization and balancing system being used in its body brace mode, and with the large LCD viewfinder of the camera being used to frame shots.
Figure 40:
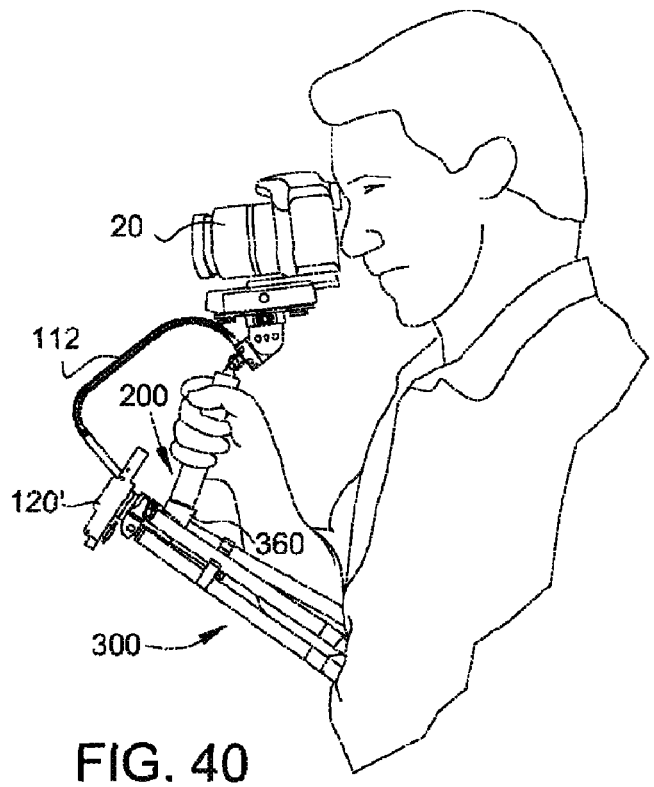
FIG. 40 is a side elevational view of the image stabilization and balancing system being used in its body brace mode, and with the optical viewfinder of the camera being used to frame shots.

In order to use the device 10 in the table top and body brace modes, the device 10 must be provided with a tilting joint 116 or 116'. In both the table top and the body brace modes, the pivoting plate 120 is pivoted to bring the tripod 300 into a position in which the necked-in lower end 210b'' of the hand grip 200 can be brought into engagement with the grooved slot 362 in the socket 360. If the device 10 is to be used in the table top mode, the lateral support bar 130 also is attached to the end of the pivoting plate 120. The angle of the tilting joint 116 or 116' can then be adjusted as appropriate for the mode in which the device 10 is being used. In the body brace mode, the angle of the tilting joint 116 can be adjusted to enable the user to use either the large LCD viewfinder or the optical viewfinder of the camera to frame shots, as shown in FIGS. 39 and 40. The ends of the tripod legs 310 can be provided with soft covers (not shown) for added cushioning against the user's torso.

While the invention has been described in terms of certain embodiments, it is not intended that the invention be limited to the above description, but rather only to the extent set forth in the claims. For example, the stabilization device 10 can be used in its balancing mode with or without the tripod.

Modifications and variations of the above-described embodiments of the present invention are possible, as appreciated by those skilled in the art in light of the above teachings. For example, the C-shaped member 110 of the stabilization device 10 can be configured to accept interchangeable tripods of varying size and weight, so that cameras of varying size and weight can be easily accommodated and different requirements regarding tripod height can be easily met. It is therefore to be understood that, within the scope of the appended claims and their equivalents, the invention may be practiced otherwise than as specifically described.

What is claimed is:

1. A hand-held image stabilization and balancing system for cameras, said system comprising:
   a main body part including a generally C-shaped member having a central section and upper and lower arms extending therefrom and defining a plane, the lower arm being longer than the upper arm;
   a camera mounting platform mounted at the upper arm of the C-shaped member,
   a joint at the free end of the upper arm, mounting the camera mounting platform to the main body part;
   a pivoting plate pivotably mounted at the free end of the lower arm for pivoting about a pivot axis perpendicular to the plane of the C-shaped member, the pivoting plate having a tripod mounting surface, first and second ends, and a channel surface opposite the tripod-mounting surface;
   a support stand having at least one leg, the support stand being mounted to the tripod mounting surface of the pivoting plate;
   a hand grip having top and bottom ends;
   means for movably securing the top end of the handle to the top portion of the body member; and
   means located at the bottom end of the handle for releasably locking the handle in a fixed position to the C-shaped member.

2. The system of claim 1, further comprising a panning joint mounting the support stand to tripod mounting surface of the pivoting plate for rotation of the support stand relative to the main body part.

3. The system of claim 1, wherein the joint mounting the camera mounting platform to the main body part is a tilting joint pivotably mounting the camera mounting platform to the main body part.

4. The system of claim 3, wherein the support stand is a tripod, and includes:
   a base;
   three legs jointed at their upper ends to the base for pivoting radially outwardly therefrom;
   a center post extending downwardly below the base perpendicular thereto; and
   a handle having a knob and a shaft extending from the knob, the shaft being removably attachable to the center post and to the tilting joint.

5. The system of claim 1, wherein:
   the channel surface is formed as a channel with a channel floor and opposed side walls extending vertically from the channel floor; and
   the lower arm of the C-shaped member is hinged in the channel for pivoting 180° about a pivot axis perpendicular to the channel side walls, between a travel position and a use position.

6. The system of claim 5, wherein the pivot axis is positioned so that in the use position, substantially the entire length of the lower arm engages the channel, and in the travel position, only the portion adjacent the end of the lower arm engages the channel.

7. The system of claim 5, wherein the lower arm of the C-shaped member and the pivoting plate are provided with means for retaining the lower arm in the channel in both the use and the travel positions.

8. The system of claim 1, wherein the tripod-mounting surface has a portion complementary in shape to the bottom end of the hand grip, adjacent the first end of the pivoting plate, and wherein the bottom end of the hand grip includes means for lockingly engaging the complementary shaped portion when the pivoting plate is in the travel position.

9. The system of claim 1, wherein the support stand is a monopod.

10. A hand-held image stabilization and balancing system for cameras, said system comprising:
    a main body part including a generally C-shaped member having a central section and upper and lower arms extending therefrom and defining a plane, the lower arm being longer than the upper arm;
    a camera mounting platform mounted at the upper arm of the C-shaped member,
    a tilting joint at the free end of the upper arm, pivotably mounting the camera mounting platform to the main body part;
    a pivoting plate pivotably mounted at the free end of the lower arm for pivoting about a pivot axis perpendicular to the plane of the C-shaped member, the pivoting plate having a tripod mounting surface;

a tripod mounted to the tripod mounting surface of the pivoting plate, wherein the tripod includes:
a base;
three legs jointed at their upper ends to the base for pivoting radially outwardly therefrom;
a center post extending downwardly below the base perpendicular thereto; and
a handle having a knob and a shaft extending from the knob, the shaft being removably attachable to the center post and to the tilting joint
a hand grip having top and bottom ends;
means for movably securing the top end of the handle to the top portion of the body member; and
means located at the bottom end of the handle for releasably locking the handle in a fixed position to the C-shaped member.

11. The system of claim 10, wherein the knob has three circumferential, leg-receiving recesses, each recess being positioned and configured for receiving a corresponding one of the legs, and a shallow circumferential recess between two of the circumferential, leg-receiving recesses for receiving the hand grip when the device is folded.

12. The system of claim 10, wherein the joint mounting the camera mounting platform to the main body part is a tilting joint pivotably mounting the camera mounting platform to the main body part, wherein the pivoting plate further includes a lateral support bar attached to the second end thereof, and wherein the tripod further includes a socket mounted to the center post, the socket being configured to matingly engage the lower end of the hand grip.

* * * * *